United States Patent
Clemm et al.

(10) Patent No.: US 10,931,542 B2
(45) Date of Patent: Feb. 23, 2021

(54) NETWORK EMBEDDED REAL TIME SERVICE LEVEL OBJECTIVE VALIDATION

(71) Applicant: Futurewei Technologies, Inc., Plano, TX (US)

(72) Inventors: Alexander Clemm, Los Gatos, CA (US); Uma S. Chunduri, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 69 days.

(21) Appl. No.: 16/101,273

(22) Filed: Aug. 10, 2018

(65) Prior Publication Data
US 2020/0052979 A1   Feb. 13, 2020

(51) Int. Cl.
*H04L 12/24*   (2006.01)
*H04L 12/26*   (2006.01)
*H04L 29/08*   (2006.01)

(52) U.S. Cl.
CPC ...... *H04L 41/5009* (2013.01); *H04L 41/0631* (2013.01); *H04L 41/5019* (2013.01); *H04L 41/5032* (2013.01); *H04L 41/5038* (2013.01); *H04L 43/16* (2013.01); *H04L 67/16* (2013.01)

(58) Field of Classification Search
CPC ............ H04L 41/0631; H04L 41/5009; H04L 41/5019
See application file for complete search history.

(56) References Cited

U.S. PATENT DOCUMENTS

| 7,574,502 | B2 * | 8/2009 | Clymer ............... H04L 41/5009 709/224 |
| 7,779,101 | B1 * | 8/2010 | Zahavi ............... G06F 11/3433 709/223 |
| 7,885,842 | B1 | 2/2011 | Bartolini et al. |
| 7,940,756 | B1 * | 5/2011 | Duffy ..................... H04L 41/50 370/389 |

(Continued)

FOREIGN PATENT DOCUMENTS

WO   WO-2019168965 A1 *   9/2019   ............ H04L 47/00

OTHER PUBLICATIONS

Foreign Communication From a Counterpart Application, PCT Application No. PCT/CN2019/099752, English Translation of International Search Report dated Oct. 28, 2019, 5 pages.

(Continued)

*Primary Examiner* — Lashonda T Jacobs
(74) *Attorney, Agent, or Firm* — Conley Rose, P.C.

(57) ABSTRACT

A mechanism is disclosed for performing network embedded real time service level objective (SLO) validation. A first data packet is received as part of a data flow. The first data packet includes a SLO indicating a network service threshold, the SLO including a key performance indicator (KPI) indicating a network service metric to be compared to the network service threshold. A service provided by the network device is measured according to the network service metric indicated by the KPI to obtain a measured service result. The measured service result is compared to the network service threshold indicated by the SLO to determine when the service provided by the network device has violated the SLO. Based on the determination that the service has violated the SLO, a defined action is performed.

20 Claims, 5 Drawing Sheets

(56) References Cited

U.S. PATENT DOCUMENTS

| | | | | |
|---|---|---|---|---|
| 8,037,365 | B2* | 10/2011 | Goldstein | G06F 11/008 714/47.2 |
| 8,140,454 | B2* | 3/2012 | Bullen | G06N 7/005 706/21 |
| 8,631,154 | B2* | 1/2014 | Bartfai-Walcott | H04L 67/322 709/240 |
| 9,112,733 | B2* | 8/2015 | Falk | H04L 41/0631 |
| 9,161,263 | B2* | 10/2015 | Kakadia | H04W 28/0268 |
| 10,306,490 | B2* | 5/2019 | Ratakonda | H04L 41/064 |
| 10,612,190 | B2* | 4/2020 | Hong | D06N 3/0095 |
| 10,659,317 | B2* | 5/2020 | Katsaros | H04L 67/02 |
| 2002/0038366 | A1* | 3/2002 | Harasawa | H04L 41/5035 709/224 |
| 2003/0120666 | A1* | 6/2003 | Tacaille | H04L 41/5048 |
| 2007/0130325 | A1* | 6/2007 | Lesser | H04L 43/0823 709/224 |
| 2008/0049639 | A1* | 2/2008 | Wiley | H04L 41/5029 370/252 |
| 2010/0091671 | A1* | 4/2010 | Lidstrom | H04L 41/5009 370/252 |
| 2012/0259962 | A1* | 10/2012 | Bose | H04L 41/50 709/223 |
| 2013/0185591 | A1* | 7/2013 | Ge | G06F 11/0709 714/26 |
| 2013/0198767 | A1* | 8/2013 | Wang | H04N 21/6583 725/14 |
| 2013/0290525 | A1* | 10/2013 | Fedor | H04L 41/147 709/224 |
| 2014/0079211 | A1 | 3/2014 | Flockhart et al. | |
| 2014/0337510 | A1* | 11/2014 | Gesmann | H04L 41/5009 709/224 |
| 2015/0163271 | A1* | 6/2015 | Handurukande | H04L 65/80 709/231 |
| 2015/0281004 | A1* | 10/2015 | Kakadia | H04L 41/0816 370/235 |
| 2015/0378805 | A1* | 12/2015 | Nakano | G06F 11/0709 714/37 |
| 2017/0104651 | A1* | 4/2017 | Kakadia | H04L 12/2854 |
| 2017/0126476 | A1* | 5/2017 | Curtin | H04L 41/5009 |
| 2017/0353362 | A1 | 12/2017 | Harutyunyan et al. | |
| 2018/0007009 | A1* | 1/2018 | Garcia Azorero | H04L 41/0893 |
| 2019/0102717 | A1* | 4/2019 | Wu | G06Q 10/06375 |
| 2019/0363950 | A1* | 11/2019 | Li | H04L 41/16 |
| 2020/0259723 | A1* | 8/2020 | Xue | H04L 43/0829 |

OTHER PUBLICATIONS

Foreign Communication From a Counterpart Application, PCT Application No. PCT/CN2019/099752, English Translation of Written Opinion dated Oct. 28, 2019, 4 pages.

* cited by examiner

NETWORK EMBEDDED REAL TIME SERVICE LEVEL OBJECTIVE VALIDATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many high precision networks operate by providing service level guarantees. A service level guarantee is a formal promise to provide a measureable quality of service, termed service level, of network communication across a provider network. Such service level guarantees are generally governed by a service level agreement (SLA) between a service provider and a client. The SLA generally defines level(s) of communication that are to be provided by the service provider's network to the client. The service provider then provides service assurance in order to be able to deliver the service levels that were promised. Service assurance involves monitoring service levels provided by the service provider's network and validating such service levels to ensure that the services provided by the network are within an acceptable range as discussed in the SLA.

SUMMARY

In an embodiment, the disclosure includes a network device comprising: a receiver configured to receive a first data packet as part of a data flow, the first data packet including a service level objective (SLO) indicating a network service threshold, the SLO including a key performance indicator (KPI) indicating a network service metric to be compared to the network service threshold; and a processor coupled to the receiver and configured to: measure a service provided by the network device according to the network service metric indicated by the KPI to obtain a measured service result; compare the measured service result to the network service threshold indicated by the SLO to determine when the service provided by the network device has violated the SLO; and based on the determination that the service has violated the SLO, perform a defined action.

Optionally, in any of the preceding aspects, another implementation of the aspect includes, wherein the first data packet includes an action set indicating the defined action, and wherein the processor is further configured to determine the defined action from the first data packet prior to performing the defined action.

Optionally, in any of the preceding aspects, another implementation of the aspect includes, wherein the first data packet includes one or more condition sets indicating a mechanism to measure the service to obtain the measured service result and indicating a mechanism to compare the measured service result to the network service threshold.

Optionally, in any of the preceding aspects, another implementation of the aspect includes, wherein the defined action includes altering metadata in the first data packet to indicate the service has violated the SLO.

Optionally, in any of the preceding aspects, another implementation of the aspect includes, wherein the defined action includes dropping the first data packet, incrementing a counter, or logging an error conditional on the determination that the service has violated the SLO.

Optionally, in any of the preceding aspects, another implementation of the aspect includes, wherein the SLO indicates the network service threshold is associated with the first data packet.

Optionally, in any of the preceding aspects, another implementation of the aspect includes, further comprising a memory, wherein the SLO indicates the network service threshold is associated with the data flow as a whole.

Optionally, in any of the preceding aspects, another implementation of the aspect includes, wherein the memory includes a statelet cache containing data specific to the data flow, the statelet cache configured to store the SLO and the KPI.

Optionally, in any of the preceding aspects, another implementation of the aspect includes, wherein the network service threshold includes a plurality of thresholds such that the SLO is violated when service provided for a first subgroup of the data flow violates a first threshold or when service provided for a second subgroup of the data flow violates a second threshold.

Optionally, in any of the preceding aspects, another implementation of the aspect includes, further comprising a memory including a statelet cache containing data indicating SLO violation status, wherein the processor is configured to perform a second defined action when the SLO is not violated over a defined time period.

Optionally, in any of the preceding aspects, another implementation of the aspect includes, wherein the second defined action includes generating data attesting that the SLO has been achieved over the defined time period.

In an embodiment, the disclosure includes a method comprising: receiving, by a receiver of a network device, a first data packet as part of a data flow, the first data packet including a service level objective (SLO) indicating a network service threshold, the SLO including a key performance indicator (KPI) indicating a network service metric to be compared to the network service threshold; and measuring, by a processor of the network device, a service provided by the network device according to the network service metric indicated by the KPI to obtain a measured service result; comparing, by the processor, the measured service result to the network service threshold indicated by the SLO to determine when the service provided by the network device has violated the SLO; and based on the determination that the service has violated the SLO, performing, by the processor, a defined action.

Optionally, in any of the preceding aspects, another implementation of the aspect includes, wherein the first data packet includes an action set indicating the defined action, and further comprising determining the defined action from the first data packet prior to performing the defined action.

Optionally, in any of the preceding aspects, another implementation of the aspect includes, wherein the first data packet includes one or more condition sets indicating a mechanism to measure the service to obtain the measured service result and indicating a mechanism to compare the measured service result to the network service threshold.

Optionally, in any of the preceding aspects, another implementation of the aspect includes, wherein the defined action includes altering metadata in the first data packet, incrementing a counter, or logging an error to indicate the service has violated the SLO or dropping the first data packet conditional on the determination that the service has violated the SLO.

Optionally, in any of the preceding aspects, another implementation of the aspect includes, wherein the SLO indicates the network service threshold is associated with the data flow as a whole.

Optionally, in any of the preceding aspects, another implementation of the aspect includes, further comprising: storing data indicating SLO violation status; and performing a second defined action when the SLO is not violated over a defined time period, wherein the second defined action includes generating data attesting that the SLO has been achieved over the defined time period.

In an embodiment, the disclosure includes a non-transitory computer readable medium comprising a computer program product for use by a network device, the computer program product comprising computer executable instructions stored on the non-transitory computer readable medium such that when executed by a processor cause the network device to: receive a first data packet as part of a data flow, the first data packet including a service level objective (SLO) indicating a network service threshold, the SLO including and a key performance indicator (KPI) indicating a network service metric to be compared to the network service threshold; measure a service provided by the network device according to the network service metric indicated by the KPI to obtain a measured service result; compare the measured service result to the network service threshold indicated by the SLO to determine when the service provided by the network device has violated the SLO; and based on the determination that the service has violated the SLO, perform a defined action.

Optionally, in any of the preceding aspects, another implementation of the aspect includes, wherein the first data packet includes an action set indicating the defined action, and the instructions further cause the network device to determine the defined action from the first data packet prior to performing the defined action.

Optionally, in any of the preceding aspects, another implementation of the aspect includes, wherein the SLO indicates the network service threshold is associated with the data flow as a whole.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
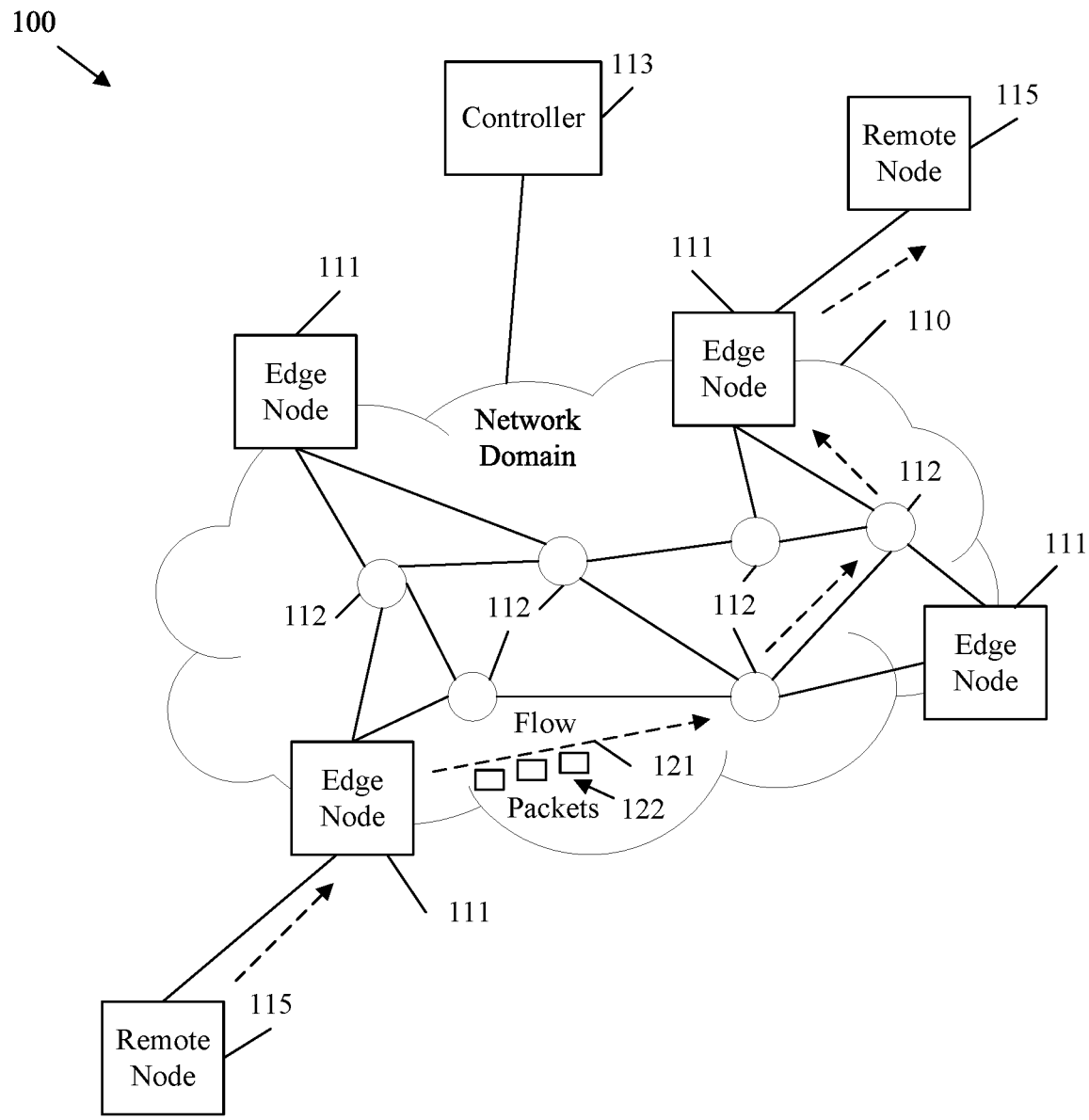
FIG. 1 is a schematic diagram of an example network for implementing network embedded real time Service Level Objective (SLO) validation.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following are definitions for several terms as used in the present disclosure. Big Packet Protocol (BPP) is a network communication protocol used for implementing self-driving packets and packet-programmable statelets. A self-driving packet is a data packet that contains a block or set of fields that define a set of conditional commands used to guide processing of the packet by a forwarding device (e.g., a network node such as a router). A conditional command is a command whose execution depends on a condition being met. It should be noted that a conditional command may be treated by a network as an unconditional command by setting a condition that always evaluates to true. A flow key is a set of characteristics that are used to associate packets with a flow, for example, a combination of packet fields (e.g., source, destination), a flow identifier (ID), and/or other special marking(s). In-situ Operations, Administration, and Maintenance (IOAM) is a mechanism by which a sampling of telemetry data can be attached to a packet as the packet traverses a network. Internet protocol (IP) is a communications protocol used for relaying data packets across network boundaries. Software Defined Network (SDN) is a network that separates control plane functions and data plane functions by placing the control plane in a controller. The controller may be centralized and may dynamically configure/program network nodes at runtime. A service level refers to the level of quality that is provided by a service according to some characteristic, for example a delay of twelve milliseconds (ms), a throughput of two hundred packets per second, etc. A Key Performance Indicator (KPI) refers to the type of the service level (e.g., packet delay, packet throughput, etc.) A SLO refers to a target for a service level, such as availability, throughput, response time, delay, and/or jitter (e.g., a delay of less than fifteen ms, a throughput better than one hundred fifty packets per second, etc.) A statelet is a segregated portion of memory maintained on a packet forwarding device, the memory configured to contain data that is associated with and can interact with self-driving packets in a data flow. A passive measurement is a measurement involving observation of production network traffic without alteration of that traffic. An active measurement is a measurement of synthetic test traffic. A hybrid measurement is a measurement involving observation of production traffic in which traffic can be altered, for example to carry measurement metadata.

A SLA generally defines, among other things service level guarantees provided by a service provider to a client in terms of SLOs, which specify that a service needs to be provided at a certain level of quality. The service provider should provide service assurance to ensure that the service levels that were promised are indeed kept, and that any violations of service level objectives are detected so that mitigating actions can be taken. In some examples, this includes taking preventive actions, in which case the service provider may focus also on detecting negative trends in service levels or an associated an shadow SLO. A shadow SLO is slightly stricter version of an SLO. Employing a shadow SLO allows the service provider to receive an alert when the actual SLO is in danger of being violated (e.g., prior to actual violation of the SLO).

An SLO sets forth a measureable characteristic of network communication service, such as availability, throughput, response time, delay and/or inter-packet delay (e.g., jitter). For example, an SLO may specify a target (e.g., objective) that should be met to provide a service level. The target/objective may be defined in terms of one or more measureable properties, which may be referred to as key performance indicators (KPIs). A KPI may include one or more measureable network service metrics such as latency, throughput, bandwidth, dropped packets, errors, jitter, out-of-order delivery, etc. The SLO may specify a threshold that should not be breached and/or an acceptable range. For clarity of discussion, threshold as used herein includes both a single value that should be violated (e.g., exceeded or subceeded, where subceed indicates to fall below) as well as a bounded range that should be maintained. The SLO can also specify statistical objectives for flows, such as a specified percentage of packets should meet a corresponding target/threshold. Service assurance may be provided for the SLO/SLA. While many mechanisms can be employed for service assurance, an example service assurance system may measure service levels according to KPIs and export measurement results to external systems and/or network controllers for analysis and comparison against the SLO boundaries/thresholds. For example, synthetic test traffic can be generated and transmitted through a network. End-to-end measurements are then conducted on the synthetic test traffic according to the KPIs. The external system/controller then determines whether the test traffic meets the SLOs. Accordingly, such systems verify the test traffic meet the SLO and presume that the test traffic is also representative of the data traffic across the network.

Such service assurance systems are associated with multiple problems. For example, implementing service assurance in external systems involves deploying separate systems for conducting measurements and monitoring service levels as part of the network operations system infrastructure, which creates additional network complexity. Such systems also export volumes of data from the network, which creates additional signaling overhead. Further, such systems experience a considerable lag between the time SLO violations occur and the time that such SLO violations are detected.

For example, SLO violations may occur for some period of time before the service assurance system elects to test for SLO violations. Such SLO violations may continue to occur while the synthetic traffic is measured and while such measurements are exported for comparison with SLO boundaries/thresholds. Accordingly, such systems are incapable of providing real time responses to SLO violations when they occur to data traffic. For example, such systems cannot detect SLO violations while data packets are still in the process of traversing the service provider network.

Disclosed herein are mechanisms to implement network-embedded real-time SLO validation. Specifically, SLO validation is performed on any traffic, including actual production traffic carrying data. In one example, data packets with headers including conditional commands are employed. The data packet headers include a command block and/or a metadata block that contain one or more conditions and one or more conditional actions. For example, the command/metadata block contains one or more SLOs indicating network service boundaries/thresholds and one or more KPI indicating network service metrics that can be employed to test compliance with the SLO. The command/metadata block also carries one or more conditional commands/actions to be executed when a SLO is violated and/or to be executed when an SLO is not violated for a period of time. For example, some conditional commands can be taken immediately for a particular packet if the condition is met (e.g., drop the packet, increase a counter, etc.) Other example commands may include long-term actions that are taken upon occurrence of a condition for the flow (e.g. the flow as a whole is determined to have too many packets for which a delay target was violated, etc.) Such may involve (for example) sending a report to a receiver on demand or upon termination of the flow. A network device/node receiving the command/metadata block measures service provided according to the KPI(s) and compares the result(s) to the SLO(s) to determine whether an SLO violation has occurred. The network device can then perform associated conditional actions, such as dropping the packet, updating packet metadata, sending an alert, attesting that SLO has not been violated, etc. The SLO can be related to the data packet or can be related to an entire flow of data packets. When the SLO is related to more than one packet (e.g., to the data flow), the network device can maintain data in memory. This may include maintaining data indicating observations of the service level provided for the flow so far, caching the SLO so the SLO need not be carried in each packet, and storing data regarding past packets so that measurements can be made. In some examples, the disclosed mechanisms can be optimized by providing the conditional commands on a first data packet and omitted on later packets to reduce overhead. Such commands can be cached at nodes along the flow path to avoid signaling the SLO on each packet. In some examples, conditional commands may only be tested and executed on ingress and egress network devices to reduce complexity for other network devices along the network path. In other examples, a packet may carry a conditional command that overrides conditional command(s) that may be cached at the device. In some examples, a command may update a conditional command that is cached on the device. Further, different nodes can validate different SLOs in some examples. In addition, the conditional commands can contain command conditions expressed as Boolean expressions, which allows for more advanced conditional SLO functions to be applied to data flow. For example, a first portion of the data flow can be tested for compliance with a first SLO and a second portion of the data flow can be tested for compliance with a second SLO. The data packets of the data flow can be associated with the first SLO or the second SLO based on whether the data packet meets a first set of conditions, the first set of conditions and a second set of conditions, the first set of conditions and the second set of conditions, etc.

Accordingly, the disclosed mechanisms allow SLOs to be validated within the network. Such validation mechanisms can be applied to production traffic, and can detect SLO violations in real time for packets of flows traversing the network. In some cases, SLO violations may even be detected while packets are still traversing the network. For example, an intermediate node may detect a late violation of a delay target caused by a packet and perform a corresponding action before the packet has reached the packet's destination. Furthermore, the disclosed validation mechanisms allow SLOs to be customized by users and/or to be programmed from the edge of the network, for example without employing centralized systems or access to a service provider's control, monitoring, and measurement infrastructure. Further, the disclosed mechanisms allows for end user customization of actions to be taken in case of SLO violation. This can be accomplished without separately programming individual network nodes along the data flow path. For example, the disclosed mechanism may allow users to assess in real-time whether SLOs are adhered to and take immediate actions if violations occur. This applies to individual packets, flows as a whole, or combinations thereof. In some cases, SLO violations caused by a flow/packet can be detected while a corresponding packet is still traversing the network (e.g., before even reaching a destination). This may allow real-time counteractions to be taken immediately, including dropping traffic that has no chance of meeting service level objectives to avoid unnecessary load on the network caused by packets that are no longer needed.

SLOs can cover any service levels that are measurable by nodes within the network, for example according to thresholds. For example, this may include inter-packet arrival delays, inter-packet arrival delay variations, packet delay, etc. In an extension, SLOs can include objectives for the flow as a whole, and not just individual packets. Such flow objectives may include multi-packet range boundaries and relative objectives. For example, an SLO may direct a node to maintain a count and/or a percentage of packets that should meet the SLO (e.g., ninety nine percent). An SLO may also direct a node to maintain target distributions (e.g., ninety nine percent within one threshold, one percent within a second threshold, etc.) In addition, SLOs can be defined as conditional and may vary depending on condition. For example SLOs can be defined to vary with flow size. This can be used, for example, to tighten ranges of SLOs with increasing flow size (and hence sample size). In a variation, the disclosed mechanisms may program SLO validation using a separate control plane (e.g., instead of self-driving packets), for example by employing a controller or control protocol extensions (e.g., by interior gateway protocols (IGPs)). This can be accomplished by allowing the controller/control plan to generate and send conditional commands to edge nodes to be attached to flow packets. Further, protocols other than BPP may be employed as long as support for statelets and conditional commands are supported.

FIG. 1 is a schematic diagram of an example network 100 for implementing network embedded real time Service Level Objective (SLO) validation. The network 100 may be operated by a service provider or other provider of networking services, such as enterprise network service providers, information technology departments, data center providers, etc. The network 100 includes a network domain 110 coupling remote nodes 115. The network domain 110 includes edge nodes 111 that act as ingress and egress points and internal nodes 112 that communicate data, such as a data flow 121 of data packets 122. In some examples, the network 100 may optionally include a controller 113, such as a software defined network (SDN) controller to manage network routing.

Remote nodes 115 are nodes that operate applications and wish to communicate. For example, remote nodes 115 may include servers, clients, and/or other computers with a network interface. Such remote nodes 115 may communicate by transmitting data flows 121 via a network domain 110. A data flow 121 is a group of related communications between a common set of end points, such as remote nodes 115. A data flow 121 can be recognized by a node 111, 112, and/or 115 as to a set of packets 122 that share common values of key fields, such as the same source IP address, destination IP address, source port address, and destination port address. As a particular example, applications operating on the remote nodes 115 can initiate a communication session. The data exchanged during the communication session may be transmitted as a data flow 121. The data in the data flow 121 is separated into data packets 122 for transmission. The data flow 121 may employ a flow key, which is a set of data packet characteristics that are used by the network domain 110 to associate data packets 122 with a data flow 121. For example, the flow key may include combinations of data packet fields that indicate flow membership. Such fields may include the source IP address, destination IP address, source port address, and destination port address. Other key fields may also be used. For example, Netflow may employ a seven tuple flow key. A data packet 122 includes a header with routing information, such as a flow key, and a payload with the data exchanged between the remote nodes 115. The payload may be encrypted in some cases, and may not be readable by the network domain 110 connecting the remote nodes 115.

The data flow 121 is exchanged between the remote nodes 115 via a network domain 110 operated by a service provider. A network domain 110 is group of interconnected network components controlled by a common set of networking policies. The network domain 110 incudes edge nodes 111, internal nodes 112, and links. The edge nodes 111 are network devices capable of converting data packets 122 into a form that complies with the policies of the network domain 110. For example, the edge nodes 111 may implement security policies for the network domain 110, change data packet 122 network addresses according to network domain 110 addressing schemes, manage pathing through the network domain 110 for the data flow 121, etc. Hence, the edge nodes 111 act as ingress and egress points into the network domain 110. As a particular example, the edge nodes 111 may determine path(s) across the network domain 110, encapsulate the packets 122 to cause the packets 122 to proceed through the network domain 110 via tunnels, etc. The edge nodes 111 are interconnected by a series of internal nodes 112 and corresponding links, depicted as lines. The internal nodes 112 are network devices, such as routers, that are configured to read data packet 122 header information and forward the data packets 122 according to the header information. The edge nodes 111 and the internal nodes 112 may also contain flow caches which maintain context information related to the data flow 121. For example, a flow cache may contain a flow cache entry associated with each data flow 121 traversing the node containing the flow cache. The flow cache entry may contain data flow 121 duration information, start time, a source address, a destination address, a number of packets 122 transmitted, an amount of data transmitted in the flow, and/or other data flow 121 related information.

In some cases, network domain 110 routing functions and data management functions may be disaggregated and spread amongst various edge nodes 111 and/or internal nodes 112 throughout the network domain 110. In other cases, the network domain 110 may include a controller 113, which is a network device configured to make routing decisions and manage network 100 operations. For example, when the network domain 110 is configured as a SDN, the controller 113 is an SDN controller. When a controller 113 is not present, a remote node 115 may initiate communications by contacting an edge node 111 to determine and setup a route for the data flow 121 through the network domain 110. When a controller 113 is present, the remote node 115 may contact the edge node 111, which then contacts the controller 113. The controller 113 maintains an awareness of network domain 110 resources, and is configured to determine network routes for the flow 121. The controller 113 can provide commands to the edge node 111 indicating the route to be used form the data flow 121. It should be noted that many different network 100 configurations can be employed by a service provider. The forgoing is provided as an example of a general data packet 122/data flow 121 routing approach for clarity of discussion and should not be considered limiting.

The network domain 110 may employ conditional commands for routing the data packets 122. The conditional commands allow the packets 122 to direct how the packets 122 should be routed (e.g., self-driving) instead of relying on network policies at the internal nodes 112 and/or edge nodes 111. A conditional command is placed in/attached to the packet 122 header by the edge node 111 acting as an ingress node (e.g., the head-end node). The conditional command includes a condition, a command, and may also include one or more parameters. The condition indicates an item that must be satisfied before the command is executed. When the condition is not met, the command is ignored. The command indicates an action or actions to be taken by the node processing the data packet 122 upon occurrence of the condition. The parameters, when present, further clarify the condition, the command, or both.

The remote node(s) 115 may communicate with the edge node(s) 111 to setup a communication. For example, the remote nodes(s) 115 may express the application's communication goals to the edge node(s) 111 and/or the controller 113. In other cases, the application's communication goals may already be known to the edge node(s) 111 and/or the controller 113, for example due to a pre-existing SLA between the operator of the remote nodes 115 and the service provider operating the network domain 110. In either case, the edge node(s) 111 and/or the controller 113 can obtain SLOs governing the communication, for example from memory and/or from the remote nodes 115. The ingress edge node 111, alone or based on commands from the controller 113, can then generate a conditional command based on the application's communication goals. The ingress edge node 111 can then append the conditional command on the data packets 122 of the data flow 121 as such packets 122 enter the network domain 110. The internal nodes 112 obtain the conditional commands from the packets 122 during routing. The internal nodes 112 may store routing commands for the data flow 121. Such routing commands may include flow 121 specific data in a flow cache and/or general routing commands, such as network domain 110 policies, Internet Protocol (IP) routing commands, media access control (MAC) routing commands, multiprotocol label switching (MPLS) commands, and/or other routing commands commonly employed for routing packets 122 via a network.

When the condition(s) for the conditional command(s) are met, the internal nodes 112 and/or edge node(s) 111 processing the packet 122 can execute the associated command (s). Such commands may be complementary commands that are executed in addition to the stored routing commands (e.g., update flow context, change data packet header data, etc.) In other cases, the commands may be override commands that are executed instead of the stored routing commands (e.g., drop packet, change next hop, etc.)

In some examples, such conditional commands are employed to program internal nodes 112 and/or edge nodes 111 to conduct SLO validation of data packets 122 carrying actual data between the remote nodes 115. For example, the data packets 122 can be transmitted according to a communication protocol known as Big Packet Protocol (BPP). A BPP data packet 122 may include a command block and/or metadata in addition to other header information. Upon entering the network domain 110, the edge node 111 may add metadata including the SLO to the data packet 122. The SLO includes an objective to be met by the communication, for example in terms of a range or other threshold, as well as a KPI indicating a measureable service metric. Accordingly, the SLO and corresponding KPIs can be interpreted by the nodes 111/112 as describing a condition to be checked (e.g., a type of measurement/calculation and a threshold/range for comparison) in order to trigger a conditional command. The edge node 111 may also add a defined action to the metadata as a conditional command. When the SLO is violated, the defined action is performed by the node 111/112 handling the packet 122.

In some examples, the conditional command(s) are specific to the data packet 122. For example, in some applications (e.g., control of a robotic arm) a late packet 122 may be more problematic than a dropped packet 122. Accordingly, the SLO may indicate that each node 111/112 should check the latency of the packet 122 and drop the packet 122 if the latency is exceeded. Other actions, such as sending an error message, setting a flag in the metadata of the packet 122, logging an error, updating a flow context, and/or updating metadata in a statelet may also be employed when the SLO is violated.

In other examples, the conditional command(s) relates to the entire data flow 121. In such a case, memory at the nodes 111/112 along the flow 121 path may be employed to store data related to multiple packets 122 from the flow 121. For example, space may be allocated in a flow cache, which is memory space containing data that is specific to a data flow 121. As another example, a statelet may be employed. A statelet is a programmable data structure that maintains state data for a data flow 121. The statelet may be implemented in a statelet cache, which is a portion of cache memory dedicated for maintaining state data for a data flow 121 in a manner similar to a flow cache. A statelet cache may be programmed and/or reprogrammed at run time by the conditional command(s) to maintain data in a desired form to suit the purposes of the SLO. It should be noted that, while many examples are described as operating on a statelet and/or a statelet cache, any programmable flow specific memory mechanism capable of maintaining flow state data can be employed to implement the SLO validation mechanisms described herein.

For example, a first data packet 122 can employ the conditional commands to setup statelets along the data flow 121 path, and a processing engine at the corresponding node can perform SLO validation by employing data stored in the statelet. A last packet 122 can then clear the statelets at the end of communication. This makes sense specifically when the SLO is the same for each packet 122 of the flow 121. Path congruency considerations apply. For example, when packets traverse a new path so that SLOs are not found, SLO validation cannot occur. One mitigation technique is a hybrid scheme in which SLOs are carried with some number of packets, but not every packet. In another example, the statelets can be setup and/or cleared by communications in a separate control plane (e.g., via IGPs and/or communication with the controller 113). Also, when an SLO applied to the flow 121 as a whole, a statelet may be used to maintain counts of the number of packets 122 meeting or violating a packet-level SLO. This can be used to determine SLOs that refer to percentiles or percentages of packets in a flow 121 that should meet certain objectives.

Regardless of the approach used, the conditional commands can direct the nodes 111/112 to take action when the flow 121 violates an SLO. As a particular example, conditional commands can direct memory at the nodes 111/112 to maintain a counter that increments for each packet 122 that has a specified condition (e.g., latency greater than two milliseconds). Further, conditional commands can cause the counter to reset or decrement under specified conditions (e.g., for each one hundred packets). Finally, conditional commands can cause the node 111/112 to take a defined action when the counter exceeds a specified threshold or other range. By employing these chains of conditions, advanced SLO checking can be implemented. For example, such a counter (e.g., in a statelet) may be employed to send a notification if one percent (%) of packets 122 in a flow 121 have a latency greater than two milliseconds. As a further example, such a notification may only be sent for flows 121 that include more than a specified number of packets 122, such as more than one hundred packets. As another example, different thresholds/ranges can be employed for different numbers of packets 122, such as a no action for flows 121 of less than twenty packets 122, a first threshold and first conditional command for a flows 121 with more than twenty and less than one hundred packets 122, and a second threshold and second conditional command for flows 121 with more than one hundred packets 122.

The conditional commands can also be employed using Boolean expressions including and/or/not logic for more complicated SLO validation. For example, multiple counters can track varying levels of packet 122 characteristics. As a particular example, a packet 122 with a characteristic that exceeds a first threshold, but not a second threshold, can increment a first counter. Further, a packet 122 with a characteristic that exceeds both boundaries can increment a second counter. Action(s) can then be taken if either counter exceeds a corresponding threshold. In this manner, an SLO can be implemented that stipulates that inter-packet delay (e.g., delay between packets) should not exceed two milliseconds for ninety-nine percent of packets 122 (e.g., the first counter) and should not exceed five milliseconds for ninety-nine and nine tenths percent of packets 122 (e.g., the second counter). While the preceding examples deal with various types of delay for simplicity of discussion, many different characteristics can be tracked by the SLO validation mechanisms disclosed herein.

It should also be noted that there are cases in which SLOs may vary for different packets 122 of the flow 121. In those cases, SLOs can be carried in later packets 122 that temporarily override the SLO deployed in the corresponding statelet for that packet 122. For example, the conditional commands carried in later packets 122 can be different from the conditional commands in earlier packets 122. In cases where the condition depends on a general property of the packet 122 or flow 121, such as a certain number of packets 122 that have been sent, the sender or edge node 111 can assess this and insert the command without the condition. In other cases, the SLOs of later packets 122 can replace the SLOs that are deployed from earlier packets 122. Likewise, there are cases in which breaking up the SLO into separate component SLOs may be of interest. Using the disclosed mechanisms, different nodes may be instructed to validate different component SLOs. For example, a first node can be directed to validate inter-packet delay, a second node can be directed to validate packet 122 latency, a third node can be directed to validate out of order delivery, a fourth node can be directed to validate jitter, etc. In yet another example, an end-to-end SLO can be broken up into multiple portions, where each portion is applied to an individual path segment instead of to the entire path. As a specific example, an SLO may include an end-to-end goal for packet delay, which could be split into end-to-end delay budgets that could be applied to corresponding path segments. Also, each node can assess a set of SLOs (e.g. the nodes could each assess multiple SLOs related to delay, loss, etc.) Further, different SLOs can be applied to different types of packets 122 within the same flow 121. For example, packets 122 with a first marking (e.g., perhaps contained in high-importance packets 122) could have a different SLO than packets 122 with a second marking, etc. It is also possible to have only egress edge nodes 111 validate the SLO. This corresponds to an end-to-end flow 121 validation case. Using BPP, this can be accomplished by using a conditional command that is conditional on the node being an egress edge node 111.

Further, instead of or in addition to flagging when SLOs are violated, the disclosed mechanisms can also be used to attest whether a flow 121 has met a corresponding SLO at all times. For example, a flag can be maintained as part of statelet metadata that indicates whether an SLO violation occurred. Such a flag can be set as part of the violation action. Specifically, a conditional command can indicate the SLO as the condition and indicate a flag set action as the conditional command. Further, another conditional command can direct the statelet to take a notification action when the statelet expires (or when a counter expires) without an SLO violation. Such information is useful for downstream accounting solutions. Such notification actions can include adding metadata to a packet 122, setting a packet 122 flag, notifying the controller 113 and/or remote node 115, etc.

The disclosed mechanisms presume that flow 121 key and/or flow 121 membership of a packet 122 can be determined by the nodes 111 and 112. For example, unencrypted headers expose IP flow key fields (e.g., in Transport Layer Security (TLS) based communications). In another example, the edge nodes 111 can apply markings to packets 122 as belonging to a corresponding flow 121. Such markings can then be read and acted upon by internal nodes 112.

The disclosed mechanisms address SLO validation within the boundaries of a single network domain 110 (e.g., one Massively Scalable Data Center (MSDC), one global service provider, one global enterprise network). Further, the disclosed mechanisms may be used in conjunction with packet programmable statelets and self-driving packets. However, other instantiations are possible in which processing commands are deployed using other control planes (e.g., with some loss of flexibility). For example, using a controller 113 model, a call setup phase could be employed before initiating the flow 121 to forward commands for SLO validation. In such a case, commands are forwarded/deployed to each node 111/112 along the path without needing to carry the commands in the packets 122. As another example, an IGP model could be deployed (e.g., with a potential loss of ability to differentiate between flows 121).

In the present disclosure, errors can be handled via BPP procedures. For example, errors can be indicated in a BPP packet 122 via a flag so the condition can be detected by downstream nodes. Errors can also be recorded inside a statelet at a node 111/112. Further, conditional commands can be categorized as non-blocking, allowing execution to be applied separately from packet 122 forwarding. Conditional commands can also be conditional on the node 111/112 being of a certain category (e.g., an edge node 111, a specific node 111/112, a statelet exporter node 111/112, etc.) Regarding measurements, statelets can be leveraged to record preceding packet 122 arrival time, current measurements (e.g., observed min/max packet 122 inter-arrival gap, etc.)

Figure 2:
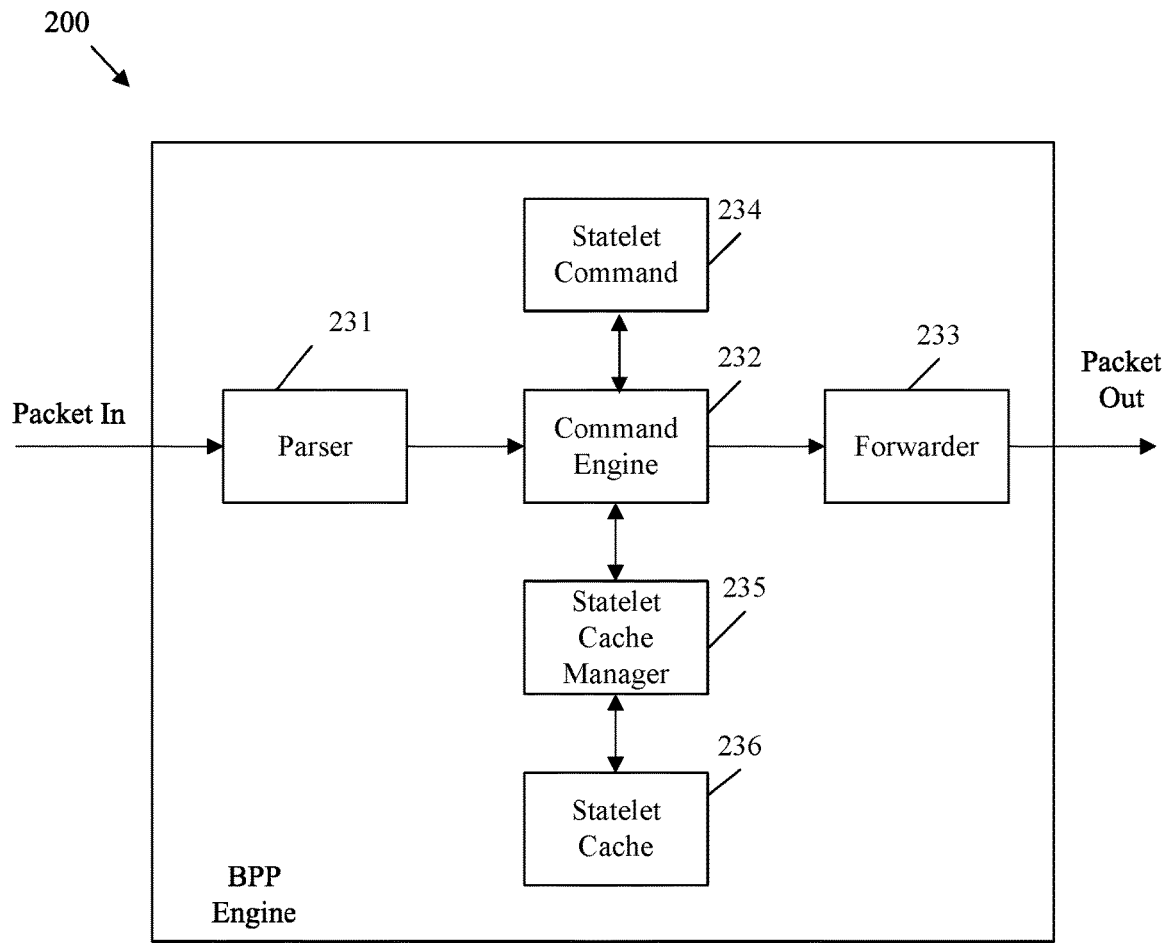
FIG. 2 is a schematic diagram of an example packet processing engine for performing network embedded real time SLO validation.

FIG. 2 is a schematic diagram of an example packet processing engine 200 for performing network embedded real time SLO validation. For example, packet processing engine 200 may operate on an edge node 111 and/or an interior node 112 in network 100. As a specific example, the packet processing engine 200 may operate according to BPP and hence may act as a BPP engine. Engine 200 includes a parser 231, a command engine 232, a statelet command module 234, a statelet cache manager 235, and a statelet cache 236.

The parser 231 is a component configured to analyze a string of symbols. Specifically, the parser 231 is configured to receive incoming data packets, such as data packets 122, and analyze the data packet header and/or metadata. When the packet processing engine 200 operates on an ingress edge node, the incoming data packets may not contain SLO validation related data. In such a case the SLO validation data is added by the command engine 232 as discussed below. For example, in such a case the packet processing engine 200 may act as a gateway, and hence attach the BPP blocks with conditional commands to be executed by downstream nodes. Accordingly, the parser 231 reads the data packet header to obtain address information to determine the source, destination, associated flow, etc. When the packet processing engine 200 operates on an interior node or an egress edge node, the data packet header and/or metadata may contain SLO validation data (e.g., inserted into the packet by the ingress edge node). In such a case, the parser 231 reads the data packet header and/or metadata to obtain the SLO validation data in addition to the address/flow information.

The command engine 232 is a component configured to receive parsed data packet information from the parser 231 and control SLO validation for the packet processing engine 200. When the packet processing engine 200 operates on an ingress edge node, the command engine 232 receives the parsed packet information and determines which flow the packet belongs to, for example via a flow key. The command engine 232 then determines which SLOs are associated with the flow, formulates conditional commands to implement the SLOs, and attaches such conditional commands to the data packet. For example, the command engine 232 may obtain the conditional commands for the SLO validation from a system administrator and/or from a user upon initiating the flow. The conditional commands may be received via a controller and/or a remote node initiating the flow. The command engine 232 may then associate such commands with the flow in memory (e.g., in the statelet cache 236 and/or in a flow cache) for attachment to incoming data packets. In such a case, the command engine 232 forwards the packets with the attached SLO validation data to the forwarder 233 for communication across the network.

When the packet processing engine 200 operates on an interior node and/or an egress node, the command engine 232 is configured to obtain SLO validation information from the incoming data packet via the parser 231. The SLO validation information may include conditional commands that implement SLO validation along with any metadata describing the SLO (e.g., which the conditional commands act on). The command engine 232 may also determine the flow associated with the packet and employ the flow information to obtain corresponding SLO validation information from the statelet cache manager 235 and/or the statelet cache 236. The command engine 232 employs the SLO validation information, for example in conjunction with the statelet cache 236, to support measurement and execution. For example, the command engine 232 can employ conditional commands to perform measurements with respect to data stored in the statelet cache 236 (e.g., time stamps of different packet of the flow in order to compute jitter and delay as well as to recognize changes in order or loss of packets) to support such measurements. Further, a measurement can be employed as a KPI referred to by an SLO. Also, the command engine 232 may perform SLO validation by comparing a measured KPI (e.g., a measurement, a packet statistic maintained in the statelet, etc.) with an objective (e.g. the threshold deemed acceptable). Specifically, the command engine 232 receives conditional commands from the data packet and/or from the statelet cache 236. The command engine 232 performs measurements as directed by the conditional commands to determine whether a condition is satisfied. As a particular example, the packet (or statelet cache 236) may contain metadata indicating the SLO in terms of thresholds or other ranges and KPIs indicating the corresponding service metrics to be measured. As non-limiting examples, such measurements/KPIs may include checking for: delay since packet creation, delay since the previous packet in the flow, packet drops, out of order packets, flow bandwidth, priority, errors, and/or other measurable network service metrics. Additionally, such checks can be subject to conditions, such as current node address equals a specified address, a condition that always evaluates to true (e.g., logically unconditional). The command engine 232 compares the results of the measurements to the SLO thresholds/ranges. When a condition is satisfied, the command engine 232 performs the corresponding conditional command, for example as specified by the data packet and/or the statelet cache 236. As non-limiting examples, such commands may include dropping a packet, setting and/or incrementing a counter in the packet metadata, setting and/or incrementing a counter in the statelet cache 236, setting a flag in the packet metadata/statelet cache 236, generating a control plane message, rerouting a packet, rerouting a flow, updating flow cache and/or routing tables, and/or other actions that can be performed by a network node. In some cases, the conditional commands employ Boolean expressions. Accordingly, in some examples the statelet command module 234 performs the indicated action when multiple conditions evaluate to true, when either of a plurality of commands evaluate to true, or when other combinational logic operation evaluate to true (e.g., exclusive or, exclusive and, etc.). The command engine 232 then forwards the data packet to the forwarder 233 for communication across the network. When the packet processing engine 200 is operating on an egress edge node, the command engine 232 may also remove SLO validation information from the data packet before forwarding the packet to the forwarder 233 for further communication out of the service provider network.

The statelet cache manager 235 is a management component configured to assign memory in statelet cache 236, write data to the statelet cache 236, read data from the statelet cache 236, and/or clear memory at the statelet cache 236. The statelet cache 236 is a programmable memory cache that can be configured to store SLO validation information and associate such information with a corresponding flow. The statelet cache 236 can be programmed, for example by conditional commands in a data packet, to hold SLO validation information associated with a flow. For example, the statelet cache 236 may store, update, and retrieve counters, flags, parameters, and other data for each flow. The statelet command module 234 is a component configured to control the creation and maintenance of the statelet cache 236 and/or statelet cache manager 235. For example, the statelet command module 234 may create new statelets and/or alter the context of an existing statelet based on commands from the command engine 232.

The forwarder 233 is a communication component configured to transmit data packets to downstream nodes/devices. For example, the forwarder 233 may make routing and/or forwarding decisions for a data packet based on commands from the statelet command module 234 and/or based on address information obtained from the data packet header by the parser 231.

Functionally, the packet processing engine 200 receives data packets at the parser 231 obtains conditional commands from packet metadata at the command engine 232, performs measurements, determines whether conditions are met, and/or performs conditional commands at the statelet command module 234, stores corresponding programmable flow state data at the statelet cache 236 to support operations at the statelet command module 234, and forwards the data packet downstream at the forwarder 233. When the packet processing engine 200 is located at an ingress edge node or an egress edge node, the packet processing engine 200 may also insert conditional commands or remove conditional commands, respectively, to support SLO validation via conditional commands by other nodes in the network.

Figure 3:
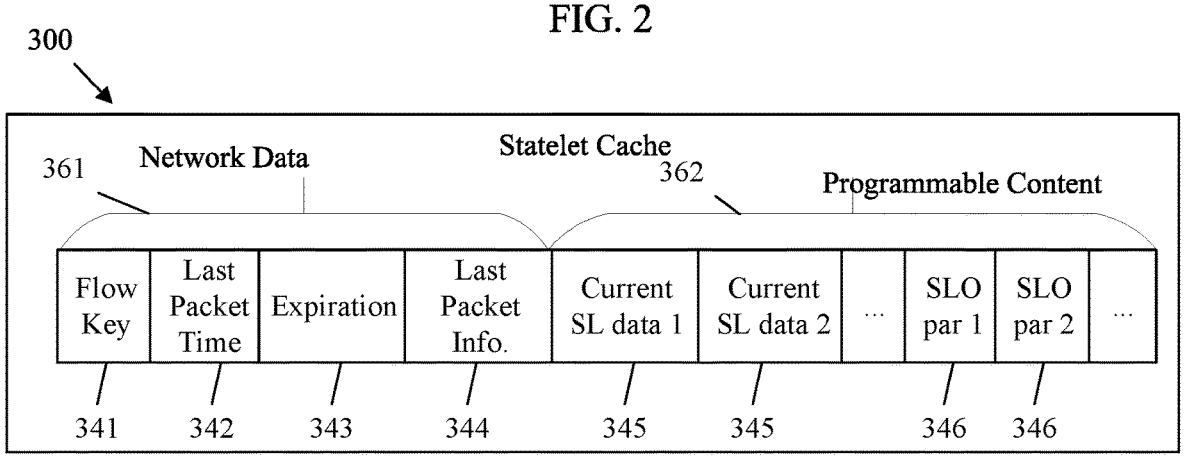
FIG. 3 is a schematic diagram of an example statelet cache for use in implementing network embedded real time SLO validation.

FIG. 3 is a schematic diagram of an example statelet cache 300 for use in implementing network embedded real time SLO validation. For example, a statelet cache 300 may be employed to implement a statelet cache 236 in a packet processing engine 200. Hence, a statelet cache 300 can be employed on a node 111 and/or 112 in network 100. A statelet cache 300 is programmable to store SLO validation data to support packet and/or flow related measurements and to support execution of conditional commands. A broad range of measurements and conditional commands can be employed to perform validation of various SLOs. Hence, the statelet cache 300 contains fields that are programmable to store virtually any data desired to support SLO validation for data packets and/or corresponding flows. The statelet cache 300 contains network data 361 and programmable content 362. The network data 361 is data related to the flow and the statelet. The programmable content 362 is data storage that is used for data content specific to the SLOs to be validated and/or corresponding actions to be taken upon SLO violation or upon meeting the SLO, depending on the example.

The network data 361 includes a flow key 341 field, which is data that can be employed to match a data packet to a corresponding flow. For example, the flow key 341 may include a combination of packet fields (e.g., a source and a destination), a flow ID, and/or other special marking(s). The network data 361 may also include a last packet time 342 field that includes a timestamp indicating when an immediately preceding packet was received for the flow indicated by the flow key 341. The network data 361 may also contain an expiration 343 field that contains a timer or timestamp. The statelet expires when the timer and/or timestamp contained in the expiration 343 field reaches zero and/or exceeds an expiration threshold. The expiration 343 field timer/timestamp may be set based on an inactivity period, where the inactivity period causes the statelet to expire when no new packet for the flow has been received for a defined time period. Further, statelet cache 300 is included as an example, and additional/different fields may be employed in some examples. The network data 361 may also contain a last packet information field 344. The last packet information field 344 may contain sequence numbers and/or hash values for checking packet order. For example, the date in the last packet information field 344 can be employed to determine when flow packets are out of order.

The programmable content 362 may contain one or more current service level (SL) data field(s) 345. The SL data field(s) 345 store measured data, counters, timers, actions, and/or other SLO validation data useful for determining whether an SLO for a flow has been violated and performing corresponding actions. As a wide range of SLO validation can occur, a wide range of data can be stored in the SL data field(s) 345. The SL data field(s) 345 can be assigned to contain specific data in response to a conditional command in a data packet and/or in response to communications from a control plane command. The programmable content 362 may also contain one or more SLO parameters 346. An SLO parameter 346 is data employed to describe an SLO and/or corresponding conditions and actions. For example, the SLO parameters 346 may include SLO thresholds/boundaries, SLO KPIs, action targets, etc. Hence, the SL data field(s) 345 can be employed to store data related to flow measurements and the SLO parameters 346 can store KPIs and thresholds/boundaries to support determination of whether an SLO has been violated. The SL data field(s) 345 and the SLO parameters 346 can also store data indicating what actions should be taken upon occurrence of one or more conditions. For example, actions can be taken upon violation of an SLO. As another example, actions can be taken when the SLO is not violated prior to expiration of the statelet according to expiration 343.

Figure 4:
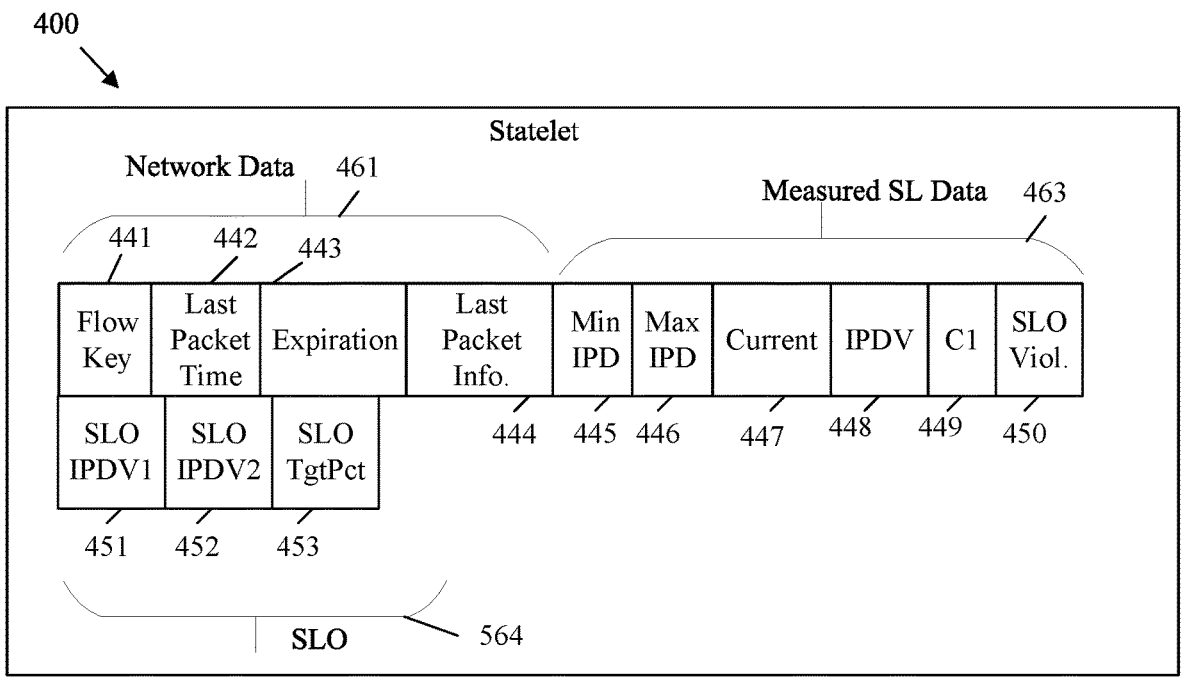
FIG. 4 is a schematic diagram of an example statelet implementation for validating an example SLO.

FIG. 4 is a schematic diagram of an example statelet 400 implementation for validating an example SLO. Specifically, statelet 400 is an example of statelet 300 that has been programmed to validate an example SLO related to inter-packet dely. Inter-packet delay is a time period between receiving a packet and receiving a subsequent packet. An SLO that sets a maximum inter-packet delay indicates that packets should be forwarded across a network at a substantially constant rate with allowable variations that are bounded by the maximum inter-packet delay. The statelet 400 is deployed on an interior node along the flow path.

The statelet 400 includes network data 461 with a flow key 441, a last packet time 442, an expiration data 443, and last packet information 444 which are substantially similar to network data 361, flow key 341, last packet time 342, expiration data 343, and last packet information 344, respectively. The statelet 400 also includes space for programmable content (e.g., programmable content 362), which includes measured SL data 463 and the SLO 564. The measured SL data 463 includes data measured by the node to determine whether the SLO has been violated. The SLO 564 includes SLO boundaries and/or KPIs. Accordingly, the measured SL data 463 can be compared to the SLO 564 to determine whether an SLO violation has occurred.

A first example SLO stipulates that inter-packet delay variation (IPDV) should not exceed two milliseconds (ms). Accordingly, allowable IPDV may be defined as a requirement that minimum packet delays and maximum packet delays for a flow are maintained within a defined time range of each other, in this case plus or minus two ms (four ms). Such an SLO may be encoded as metadata in a BPP packet and forwarded along a flow path to setup statelets, such as statelet 400, along the path. Based on the commands in the packet(s), an example interior node stores the allowable IPDV as the SLO 564. Specifically, the node may store the allowable IPDV (e.g., four ms) in a first SLO IPDV (SLO IPDV1) 451 field. Accordingly, the SLO IPDV1 451 is configured to contain the threshold/range of the SLO.

Further, the commands in the packet(s) cause the example interior node to make several measurements of KPIs for comparison to the SLO 564. Such measurements are stored in the measured SL data 463. The node may store last packet information 444 and may include order information regarding the last packet received. The node measures inter-packet delay (IPD), which is the difference between the current packet arrival time and the previous packet arrival time. The current packet arrival time may be stored in a current field 447. Upon receiving the next packet, the data in the current field 447 indicates the previous packet arrival time. Such data can be employed to measure IPD. Then the arrival time for the new current packet can be stored in the current field 447 for the next packet, etc.

The IPD is stored as a minimum IPD 445 containing the smallest IPD and a maximum IPD 446 containing the largest IPD over multiple packets in the flow. When the second packet is received, the first IPV measurement is performed. When this occurs, minimum IPD 445 and maximum IPD 446 are compared to the measured IPD between the first packet and the second packet. The current IPDV is stored in an IPDV 448 field. As the minimum IPD 445 and the maximum IPD 446 are the same at this point, the initial IPDV is zero. Accordingly, IPDV 448 is initialized to zero upon receiving the second packet. For further packets, the currently measured IPD is compared to the minimum IPD 445 and the maximum IPD 446. When the currently measured IPD is less than the minimum IPD 445, minimum IPD 445 is updated to include the currently measured IPD. When the currently measured IPD is greater than the maximum IPD 446, the maximum IPD 446 is updated to include the currently measured IPD. Each time the minimum IPD 445 or the maximum IPD 446 changes, the minimum IPD 445 is subtracted from the maximum IPD 446. The result is stored as an updated IPDV 448 for the flow. As such, the IPDV 448 for the flow, which acts as a KPI, is updated and stored in the measured SL data 463 of the statelet 400 based on the measurements.

Further, each time a packet is received (or each time IPDV 448 is updated), the node compares the IPDV 448 (the measured KPI) to the SLO IPDV1 451 containing the SLO range/threshold. When the IPDV 448 exceeds the SLO IPDV1 451, the SLO has been violated. As such, when the IPDV 448 exceeds the SLO IPDV1 451, a SLO violation action is triggered. For example, an SLO violation 450 field can be included in the measured SL data 463. The SLO violation action may cause the SLO violation 450 to be set to true when an SLO violation occurs. A notification or a message may be sent to an administrator when SLO violation 450 is set to true and/or when the statelet 400 expires with SLO violation 450 set to true.

The abovementioned control logic can be encoded in packet(s) in the flow, for example in the metadata and/or in a conditional command block in the packet header(s). A compact encoding of this control logic can be accomplished by employing specialized commands in the packet headers. A first command may indicate to update IPDV 448 by using a system defined minimum and maximum IPDV 448 parameters as well as a system defined IPDV 448 measurement. A second command can indicate that the violation action should be performed conditionally upon the occurrence of IPDV 448 exceeding SLO IPDV1 451.

A more complex second example SLO can be deployed using statelet 400 by adding additional SLO 564 and measured SL data 463 fields. The second example SLO stipulates that IPDV 448 should not exceed two ms for ninety nine percent of packets for the flow. Further, IPDV 448 should not exceed five ms for any packet in the flow. Also, the second example SLO should only be applied when the flow contains more than one hundred packets. In this case, the SLO 564 includes a SLO IPDV1 451 with parameters set to four ms (e.g., plus or minus two ms) and greater than one hundred packets, a second SLO IPDV (SLO IPDV2) 452 field set to ten ms (e.g., plus or minus two ms), and an SLO target percentage 453 field set to one percent. The statelet 400 determines whether IPDV 448 exceeds SLO IPDV2 452 in a manner similar to the first example in order to implement the stipulation that IPDV 448 should not exceed five ms for any packet in the flow. When this occurs, SLO violation 450 is set to true.

Regarding the two ms stipulation, a counter (C1) 449 is stored in the measured SL data 463. C1 449 is initialized to zero upon receiving the first packet and updated each time a packet exceeds two ms IPDV and does not exceed five ms IPDV. Accordingly, when a packet is received, the node compares a packet count to the SLO IPDV1 451 to determine whether the flow is larger than one hundred packets. The packet count may be obtained from a separate flow cache or from the last packet information 444 field. Further, the node compares C1 449 with the packet count to determine a percentage of packets with IPDV between two ms and five ms. The percentage of packets with IPDV between two ms and five ms can then be compared with SLO target percentage 453. When the percentage of packets with IPDV between two ms and five ms exceeds the SLO target percentage 453, the SLO violation 450 is set to true. The two ms stipulation can be encoded by a first command directing the node to maintain the number of packets that exceeded two ms IPDV, but not five ms IPDV. A second command is conditional on the packet count exceeding one hundred and C1 449 exceeding one percent of the packet count. Such a command then triggers the SLO violation action.

Figure 5:
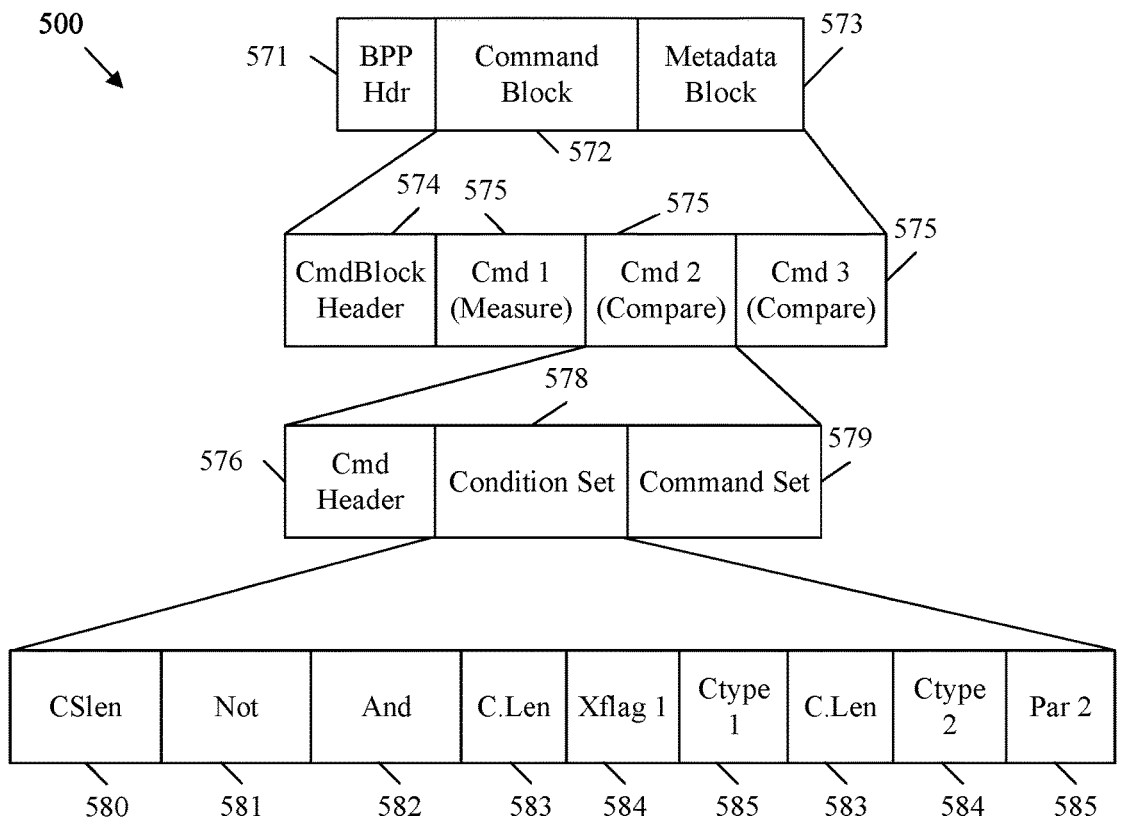
FIG. 5 is a schematic diagram of an example packet header that can be employed to instruct a node to validate an SLO.

FIG. 5 is a schematic diagram of an example packet header 500 that can be employed to instruct a node to validate an SLO. For example, packet header 500 can be employed to instruct an interior node 112 containing a packet processing engine 200 to employ a statelet cache 300 to implement a statelet 400. The packet header 500 can be inserted into a packet by an ingress edge node, processed by interior nodes along the flow path, and removed by an egress edge node.

The packet header 500 contains a BPP header 571 that contains data indicating that the packet is communicated according to BPP protocol. The BPP header 571 may also contain other data related to the packet, such as the length of the conditional command portion of the data packet, protocol version, etc. The packet header 500 also contains a command block 572 and a metadata block 573. The command block 572 and/or the metadata block 573 contain various conditions and conditional commands to be implemented when the conditions are met. For example, the command block 572 and/or the metadata block 573 may contain one or more conditional commands to implement the SLO as well as commands indicating actions to be taken when an SLO is violated.

As shown, the command block 572 and/or the metadata block 573 may include a command block header 574 and one or more commands 575. The command block header 574 may contain data indicating the length of the entire block of commands as well as various flags containing administrative data for use in the BPP protocol. The commands 575 may contain one or more conditional commands that, when executed, validate an SLO. In the example shown, the commands 575 include a measure command and two compare commands. In the event that the second example discussed with respect to FIG. 4 is implemented, the commands 575 may include a measure command to compute an IPD and update an IPDV in a statelet. The commands 575 may then include a compare command to compare the measured IPDV with an absolute IPDV SLO (e.g., no packets with IPDV of greater than five ms). The commands 575 may then include a compare command to compare the measured IPDV with a bounded IPDV SLO (e.g., ninety nine percent of packets have IPDV of less than two ms).

A command 575 contains a command header 576, a condition set 578, and a command set 579. The command header 576 may contain data indicating the presence of a following condition, a condition number/length, and/or a Boolean operation to be applied to the set of conditions (e.g., and vs or where and is applied by default). The condition set 578 contains the condition(s) that implement the command 575. For example, when the command is to compare the measured IPDV to an absolute IPDV, the condition set 578 may contain conditions to check whether a current IPDV measured by the measure command is greater than an SLO IPDV stored in the statelet. The command set 579 contains commands to be initiated when the condition set 578 is satisfied (e.g., when the SLO is violated). For example, the command set 579 may contain commands to set an SLO violated flag in the statelet.

The condition set 578 contains various fields to describe the conditions. For example, the condition set 578 may contain a condition set length block 580 indicating the length of the condition set 578. The condition set 578 may also contain a not field 581, which may indicate a default Boolean condition. The condition set 578 may also contain an and field 582 that can be set to indicate whether the conditions should all be true (e.g., logical and) or whether any of the conditions should be true (e.g., logical or) to consider the condition set 578 satisfied. The condition set 578 may also contain condition length fields 583 indicating the length of corresponding conditions in the set. The condition set 578 may also contain x flags 584 that can be set to modify the condition. The condition set 578 may further include condition type 585 fields that can be set to indicate the conditions of the condition set 578. For example, the condition type 585 fields may indicate that the measured IPDV should be obtained and then indicate that the measured IPDV should be compared with the SLO IPDV stored in the statelet.

As shown above, the command block 572 and/or the metadata block 573 can be encoded with various conditions and conditional commands to interact with a statelet in order to validate an SLO in real time.

The present disclosure employs both self-driving packets with conditional commands and packet-programmable statelets to validate SLOs. However, variations of the disclosure may rely on a separate control plane instead of self-driving packets. In most examples, an SLO is specified as metadata in a packet header 500. The packet header 500 is added to packets in the flow that is subjected to an SLO (e.g., in a BPP packet's metadata block). The packet header 500 is generally added to the packets at the network edge. The SLO specifies the KPI (or a set of KPIs) to be measured, as well as the objective. As the packet traverses the network, each node measures the service level or KPI that was observed for the packet. The node then compares the observation with the SLO and determines whether the observation is within the boundaries of the SLO. In cases where the SLO concerns the flow as a whole, the service level or KPI for the flow is updated and maintained in the flow's statelet. The SLO is then compared against the observed service level.

When a violation is detected, an action can be taken. Such action can be customizable by a user, for example based on data included in a command set 579 of a BPP packet. Actions can include sending an alert, logging the violation, and/or storing an indication of the violation in the flow's statelet. In addition, the packet is flagged in order to avoid double reporting by downstream nodes detecting the same violation. In some examples, the packet may be dropped, for example in case of applications where a late packet is useless or even harmful, such as in certain industrial applications. Statelets with any SLO information, SL measurements, etc. are deleted/cleaned up and optionally exported. This may occur at the end of the flow as determined by inactivity. The commands are carried in self-driving packets and executed by corresponding node infrastructure.

Figure 6:
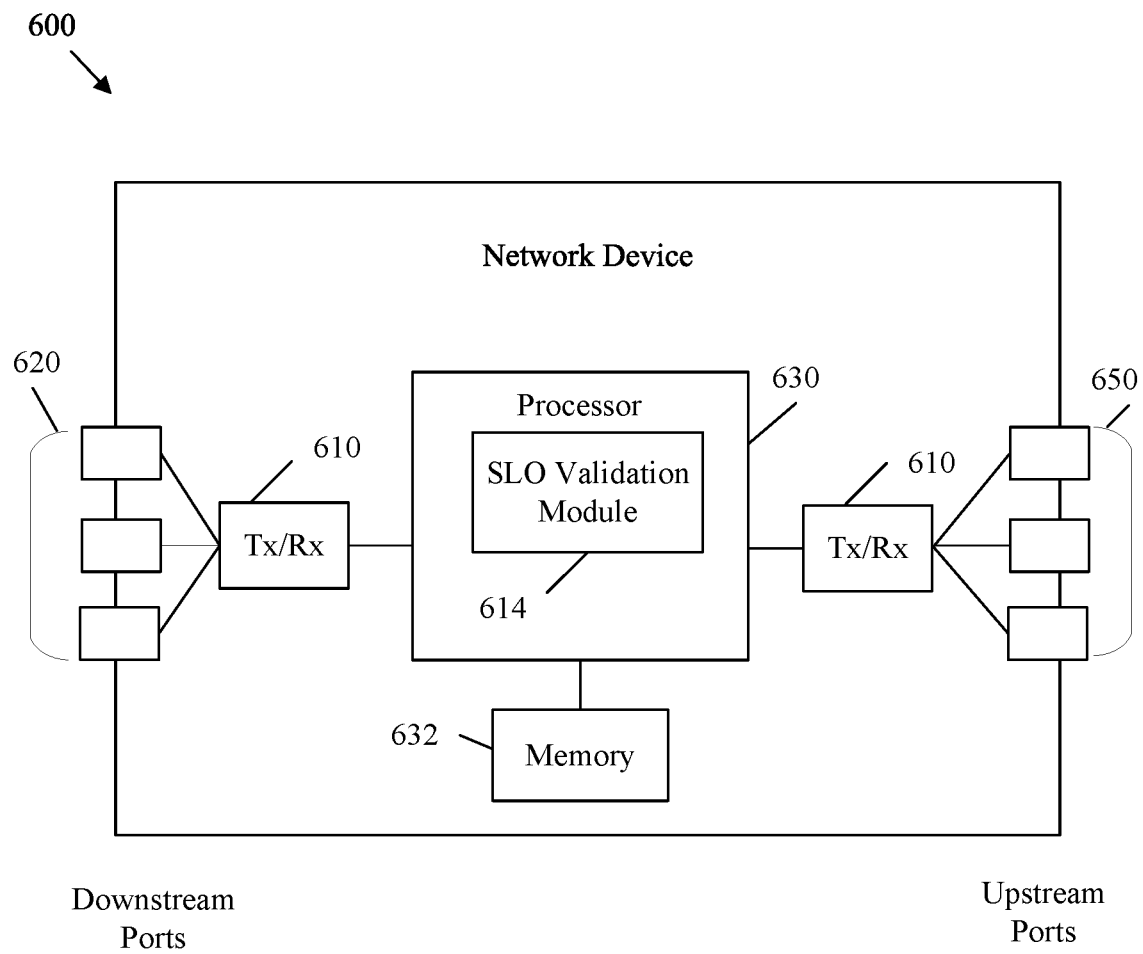
FIG. 6 is a schematic diagram of an example network device for implementing network embedded real time SLO validation.

FIG. 6 is a schematic diagram of an example network device 600 for implementing network embedded real time SLO validation, for example on network packets, such as data packets 122 as part of a data flow 121. For example, network device 600 may implement an edge node 111, an internal node 112, and/or a controller 113 in a network domain 110. Further, the network device 600 can be configured to implement method 700 as well as other methods/mechanisms disclosed herein. For example, the network device 600 can implement a packet processing engine 200 that employs a statelet cache 300 which implements a statelet 400. Further, the network device 600 can be configured to perform SLO validation in response to receiving a packet header 500.

Accordingly, the network device 600 may be configured to implement or support the schemes/features/methods described herein. For instance, the features/methods in the disclosure may be implemented using hardware, firmware, and/or software installed to run on hardware. One skilled in the art will recognize that the term network device encompasses a broad range of devices of which network device 600 is merely an example. Network device 600 is included for purposes of clarity of discussion, but is in no way meant to limit the application of the present disclosure to a particular network device embodiment or class of network device embodiments.

The network device 600 may be a device that communicates electrical and/or optical signals through a network, e.g., a switch, router, bridge, gateway, etc. In some cases, the network device 600 may act alone, or in concert with other network devices 600 to operate a virtual network device with the functionality described herein. As shown in FIG. 6, the network device 600 may comprise transceivers (Tx/Rx) 610, which may be transmitters, receivers, or combinations thereof. A Tx/Rx 610 may be coupled to a plurality of downstream ports 620 (e.g., downstream interfaces) for transmitting and/or receiving frames from other nodes and a Tx/Rx 610 coupled to a plurality of upstream ports 650 (e.g., upstream interfaces) for transmitting and/or receiving frames from other nodes, respectively. A processor 630 may be coupled to the Tx/Rxs 610 to process the data signals and/or determine which nodes to send data signals to. The processor 630 may comprise one or more multi-core processors and/or memory devices 632, which may function as data stores, buffers, etc. For example, the memory devices 632 can contain statelet caches for use by the SLO validation module 614. Processor 630 may be implemented as a general processor or may be part of one or more application specific integrated circuits (ASICs) and/or digital signal processors (DSPs). The network device 600 may comprise a SLO validation module 614, which may be configured to perform SLO validation on packets for data flows and perform corresponding actions when SLO is violated or attest when SLO is not violated. For example, the SLO validation module 614 can receive data packets, obtain conditional commands from the data packet, and determine whether a condition in the conditional command is satisfied based on packet header data, network device 600 state, and/or based on associated parameters in the conditional command. Upon determining that the condition is met (e.g., the SLO is violated), the SLO validation module 614 can execute the command from the conditional command, for example based on corresponding parameters stored in the conditional command. Such a command may cause the SLO validation module 614 to modify packet data, flow context, routing commands, network device 600 state, and/or perform other actions to the data packet and/or the corresponding flow. The SLO validation module 614 may be implemented in a general purpose processor, a field programmable gate array (FPGA), an ASIC, a DSP, a microcontroller, etc. In alternative embodiments, the SLO validation module 614 may be implemented in processor 630 as computer executable instructions stored in memory device 632 (e.g., as a computer program product stored in a non-transitory computer readable medium), which may be executed by processor 630, and/or implemented in part in the processor 630 and in part in the memory device 632. The downstream ports 620 and/or upstream ports 650 may contain wireless, electrical and/or optical transmitting and/or receiving components, depending on the embodiment.

Figure 7:
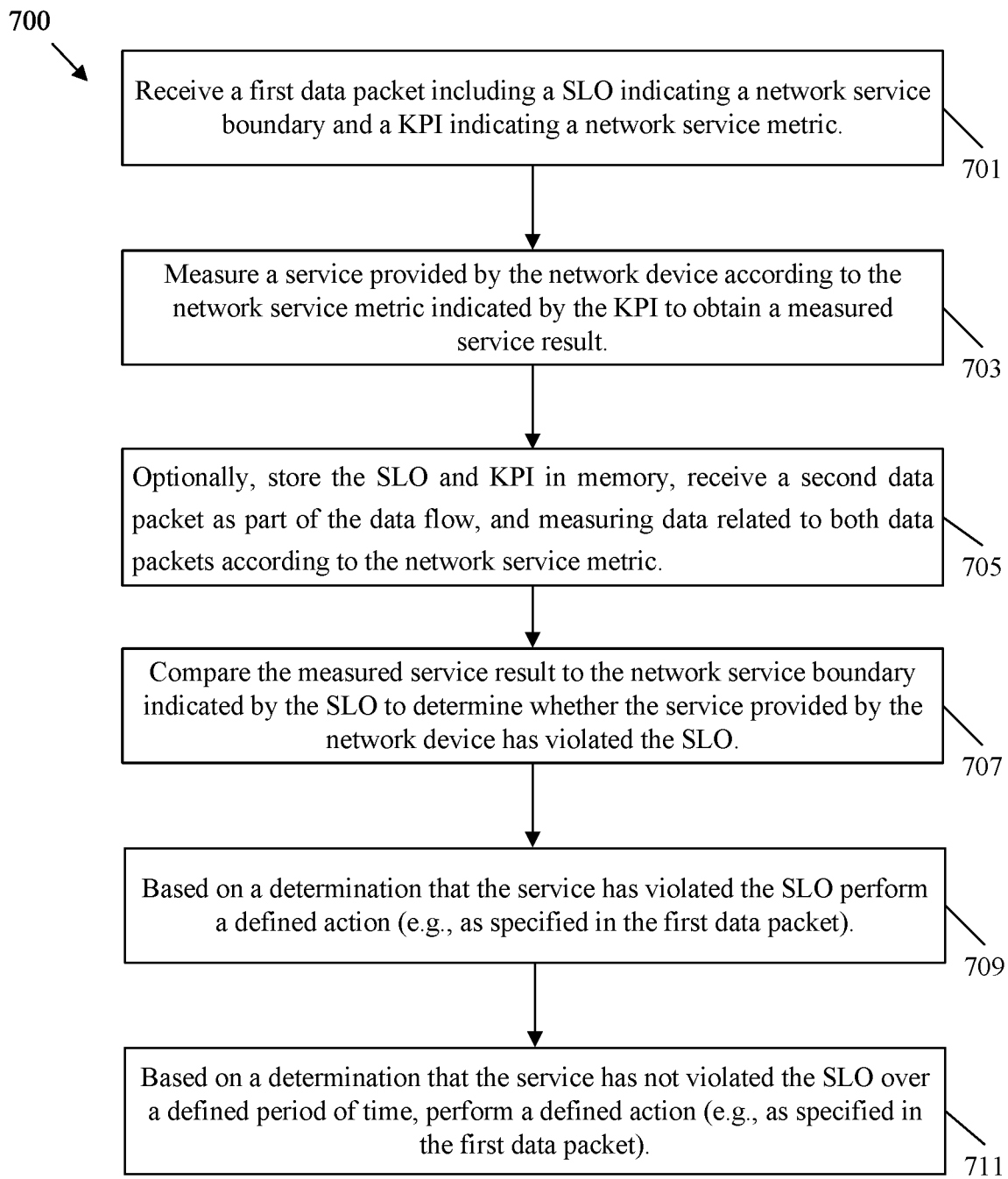
FIG. 7 is a flowchart of an example method for implementing network embedded real time SLO validation.

FIG. 7 is a flowchart of an example method 700 for implementing network embedded real time SLO validation, for example on network packets, such as data packets 122 as part of a data flow 121. For example, method 700 may be implemented by an edge node 111 and/or an internal node 112 in a network domain 110. Further, method 700 can be implemented on a network device 600 implementing a packet processing engine 200 that employs a statelet cache 300 which implements a statelet 400. Further, the method 700 can perform SLO validation in response to receiving a packet header 500.

At block 701, a first data packet can be received as part of a data flow. The first data packet may include one or more SLOs indicating a network service threshold/range. The first data packet may also contain one or more KPIs indicating network service metrics. The SLO and KPI may be included in a packet header, for example in a command block and/or a metadata block.

At block 703, a service provided by the network device is measured according to the network service metric indicated by the KPI. This allows a measured service result to be obtained. In some cases, the SLO and KPI are related to a corresponding packet. For example, the SLO may indicate the network service threshold/range is associated with the first data packet. In other cases, the SLO and KPI are related to the flow. Further, the first data packet may include one or more condition sets in order to indicate a mechanism to measure the service in order to obtain the measured service result. Also, the first data packet may contain condition sets to indicate a mechanism to compare the measured service result to the network service threshold.

Optional block 705 may be employed when the SLO and KPI indicates the network service threshold is associated with the data flow. In such a case, measuring the service also includes storing the SLO and KPI in the memory. For example, a statelet cache containing data specific to the data flow can be employed to store the SLO, the KPI, and one or more measurements related to the data flow. A second packet can then be received as part of the data flow. Data related to the first data packet and the second data packet can then be measured according to the network service metric.

At block 707, the measured service result of block 703 and/or 705 is compared to the network service threshold indicated by the SLO. This results in determining when the service provided by the network device has violated the SLO. In some cases, the network service threshold includes a plurality of thresholds/ranges. For example, the SLO may indicate that some sub-portion of packets in the flow should meet a first threshold/range while another portion of packets in the flow should meet a second threshold/range (e.g., ninety nine percent of packets should have less than a first IPDV and all packets should have less than a second IPDV as discussed in the examples above). In such a case, the SLO is violated when service provided for a first subgroup of the data flow violates a first threshold or when service provided for a second subgroup of the data flow violates a second threshold.

At block 709, a defined action can be performed based on the determination that the service has violated the SLO. For example, the defined action may be included in an action set in the first packet. Accordingly, the defined action can be determined from the first data packet prior to performing the defined action. For example, the defined action may include altering metadata in a data packet in order to indicate the service for the corresponding data packet has violated the SLO. As another example, the defined action may include dropping a data packet conditional on the determination that the service for the corresponding data packet has violated the SLO.

At block 711, a defined action can be performed based on a determination that the service has not violated the SLO over a defined period of time. In this case, the SLO is applied to a flow as a whole, and not just to an individual packet. Such SLOs can spell out objectives that refer to, for example, percentiles and/or percentages of packets in a flow. The defined action may be included in an action set in the first packet. For example, a statelet cache may be employed to contain data indicating an SLO violation status. The defined action can be performed when the SLO is not violated over a defined time period, for example by triggering the defined action upon expiration of the statelet. In this case, the defined action may include generating data attesting that the SLO has been achieved over the defined time period. It should be noted that blocks 709 and 711 may occur in the alternative in some examples. In other examples, blocks 709 and 711 may both occur, for example over many repetitions of method 700. Accordingly, the order shown for method 700 is presented for clarity of discussion and may not be considered limiting unless otherwise specified.

The disclosure includes a network device comprising: a receiving means for receiving a first data packet as part of a data flow, the first data packet including a service level objective (SLO) indicating a network service threshold, the SLO including a key performance indicator (KPI) indicating a network service metric to be compared to the network service threshold; and a processing means for: measuring a service provided by the network device according to the network service metric indicated by the KPI to obtain a measured service result; comparing the measured service result to the network service threshold indicated by the SLO to determine when the service provided by the network device has violated the SLO; and based on the determination that the service has violated the SLO, performing a defined action.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network device comprising:
   a receiver configured to receive a data packet as part of a data flow, the data packet including a service level objective (SLO) indicating a network service threshold, the SLO including a key performance indicator (KPI) indicating a network service metric to be compared to the network service threshold; and
   a processor coupled to the receiver and configured to:
      measure a service provided by the network device according to the network service metric indicated by the KPI to obtain a measured service result;
      compare the measured service result to the network service threshold indicated by the SLO to determine when the service provided by the network device has violated the SLO; and
      based on the determination that the service has violated the SLO, perform a defined action.

2. The network device of claim 1, wherein the data packet includes an action set indicating the defined action, and wherein the processor is further configured to determine the defined action from the data packet prior to performing the defined action.

3. The network device of claim 1, wherein the data packet includes one or more condition sets indicating a mechanism to measure the service to obtain the measured service result and indicating a mechanism to compare the measured service result to the network service threshold.

4. The network device of claim 1, wherein the defined action includes altering metadata in the data packet to indicate the service has violated the SLO.

5. The network device of claim 1, wherein the defined action includes dropping the data packet, incrementing a counter, or logging an error conditional on the determination that the service has violated the SLO.

6. The network device of claim 1, wherein the SLO indicates the network service threshold is associated with the data packet.

7. The network device of claim 1, further comprising a memory, wherein the SLO indicates the network service threshold is associated with the data flow as a whole.

8. The network device of claim 7, wherein the memory includes a statelet cache containing data specific to the data flow, the statelet cache configured to store the SLO and the KPI.

9. The network device of claim 7, wherein the network service threshold includes a plurality of thresholds such that the SLO is violated when service provided for a first subgroup of the data flow violates a first threshold or when service provided for a second subgroup of the data flow violates a second threshold.

10. The network device of claim 1, further comprising a memory including a statelet cache containing data indicating SLO violation status, wherein the processor is configured to perform a second defined action when the SLO is not violated over a defined time period.

11. The network device of claim 10, wherein the second defined action includes generating data attesting that the SLO has been achieved over the defined time period.

12. A method comprising:
   receiving, by a receiver of a network device, a data packet as part of a data flow, the data packet including a service level objective (SLO) indicating a network service threshold, the SLO including a key performance indicator (KPI) indicating a network service metric to be compared to the network service threshold; and
   measuring, by a processor of the network device, a service provided by the network device according to the network service metric indicated by the KPI to obtain a measured service result;
   comparing, by the processor, the measured service result to the network service threshold indicated by the SLO to determine when the service provided by the network device has violated the SLO; and
   based on the determination that the service has violated the SLO, performing, by the processor, a defined action.

13. The method of claim 12, wherein the data packet includes an action set indicating the defined action, and further comprising determining the defined action from the data packet prior to performing the defined action.

14. The method of claim 12, wherein the data packet includes one or more condition sets indicating a mechanism to measure the service to obtain the measured service result and indicating a mechanism to compare the measured service result to the network service threshold.

15. The method of claim 12, wherein the defined action includes altering metadata in the data packet, incrementing a counter, or logging an error to indicate the service has violated the SLO or dropping the data packet conditional on the determination that the service has violated the SLO.

16. The method of claim 12, wherein the SLO indicates the network service threshold is associated with the data flow as a whole.

17. The method of claim 12, further comprising:

storing data indicating SLO violation status; and performing a second defined action when the SLO is not violated over a defined time period, wherein the second defined action includes generating data attesting that the SLO has been achieved over the defined time period.

18. A non-transitory computer readable medium comprising a computer program product for use by a network device, the computer program product comprising computer executable instructions stored on the non-transitory computer readable medium such that when executed by a processor cause the network device to:

receive a data packet as part of a data flow, the data packet including a service level objective (SLO) indicating a network service threshold, the SLO including a key performance indicator (KPI) indicating a network service metric to be compared to the network service threshold;

measure a service provided by the network device according to the network service metric indicated by the KPI to obtain a measured service result;

compare the measured service result to the network service threshold indicated by the SLO to determine when the service provided by the network device has violated the SLO; and based on the determination that the service has violated the SLO, perform a defined action.

19. The non-transitory computer readable medium of claim 18, wherein the data packet includes an action set indicating the defined action, and the instructions further cause the network device to determine the defined action from the data packet prior to performing the defined action.

20. The non-transitory computer readable medium of claim 18, wherein the SLO indicates the network service threshold is associated with the data flow as a whole.

\* \* \* \* \*